United States Patent
Tatar

[11] Patent Number: 5,600,914
[45] Date of Patent: Feb. 11, 1997

[54] FISH PENETRATING TOOL

[76] Inventor: George E. Tatar, R.R. #1 County Rd. #39, Bloomingdale, Ohio 43910

[21] Appl. No.: 611,238

[22] Filed: Mar. 5, 1996

[51] Int. Cl.[6] .......................... A01K 81/00; A01K 97/00
[52] U.S. Cl. .................. 43/6; 30/125; 30/164.5; 81/439; 403/383; 43/4
[58] Field of Search .................... 43/4, 5, 6; 30/164.5, 30/164.8, 125, 339, 329; 81/489, 490, 177.85, 439; 7/167; 403/383

[56] References Cited

U.S. PATENT DOCUMENTS

| 192,084 | 6/1877 | Root | 403/321 |
|---|---|---|---|
| 1,448,895 | 3/1923 | Yotta | 81/438 |
| 1,768,035 | 6/1930 | Domaratius | 30/164.5 |
| 2,423,899 | 7/1947 | Odgard | 43/4 |
| 2,476,762 | 7/1949 | Petre et al. | 81/438 |
| 2,651,840 | 9/1953 | Taylor | 30/164.5 |
| 2,803,877 | 8/1957 | Belanger | 30/125 |
| 3,004,362 | 10/1961 | Day | 43/6 |
| 3,621,899 | 11/1971 | Hula | 30/339 |
| 4,043,067 | 8/1977 | Konucik et al. | 43/6 |
| 4,328,721 | 5/1982 | Massari | 81/439 |
| 4,581,961 | 4/1986 | Lai | 81/439 |
| 4,779,493 | 10/1988 | White | 81/439 |

*Primary Examiner*—Jeanne M. Elpel

[57] ABSTRACT

A fish penetrating tool for killing fish which have been previously caught by the user. The tool has both an opened and a closed orientation. In its broadest context, the tool includes a handle with a hollow interior and a fish penetrating needle. The needle can be secured to the handle in a first sense with the needle extending outwardly from the handle and a second sense with the needle secured within the hollow interior of the handle.

5 Claims, 3 Drawing Sheets

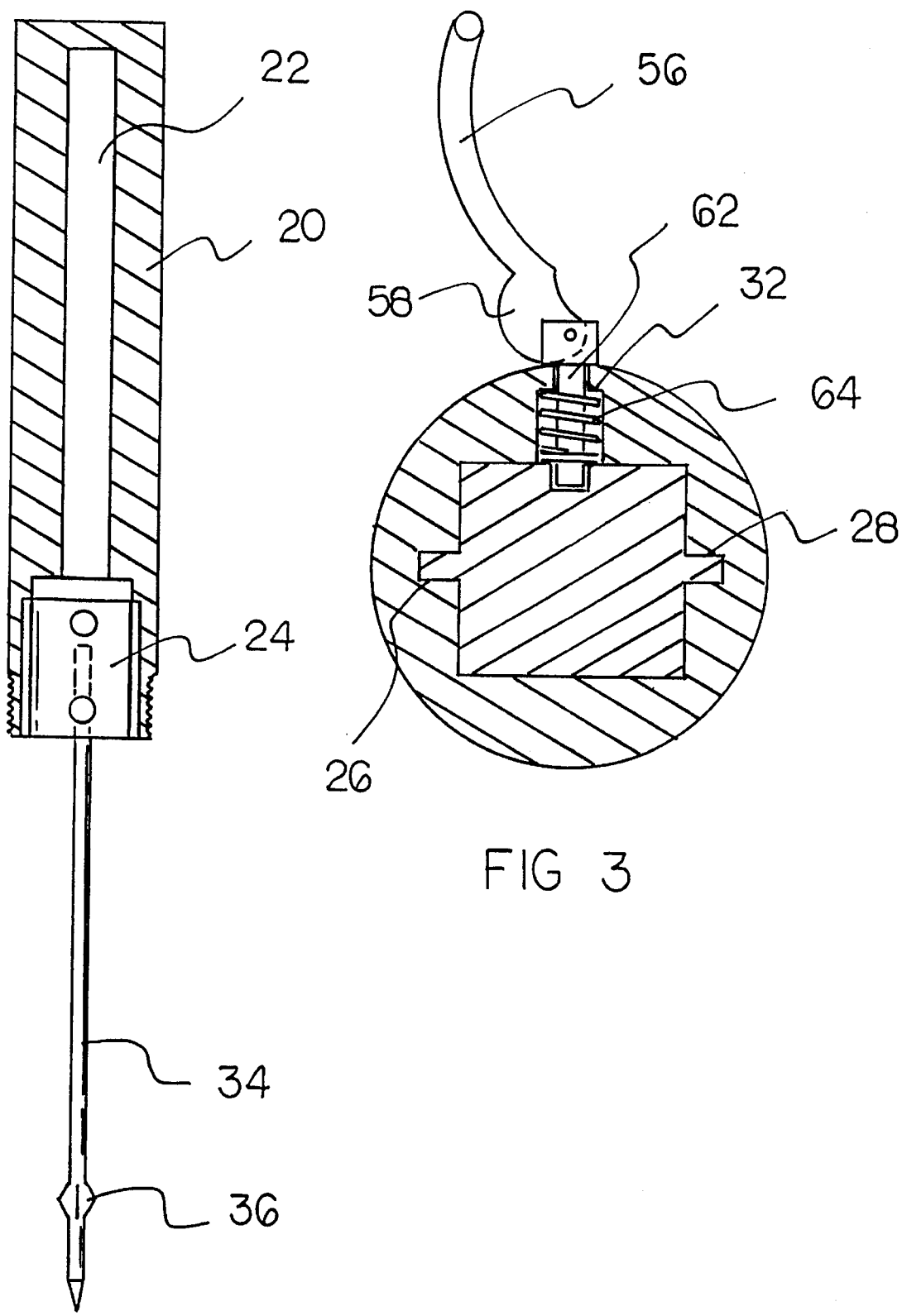

FISH PENETRATING TOOL

BACKGROUND OF THE INVENTION

1. Field of the Invention

The present invention relates to fish penetrating tool and more particularly pertains to a self Contained tool to kill fish.

2. Description of the Prior Art

The use of penetrating instruments is known in the prior art. More specifically, penetrating instruments heretofore devised and utilized for the purpose of assisting surgery are known to consist basically of familiar, expected, and obvious structural configurations, notwithstanding the myriad of designs encompassed by the crowded prior art which has been developed for the fulfillment of countless objectives and requirements.

For example, U.S. Pat. No. 5,226,426 to Yoon illustrates a safety penetrating instrument. U.S. Pat. No. 4,951,531 to Nishio illustrates a tire puncture mending tool. U.S. Pat. No. Des. 264,676 to Sokolowski illustrates a design for an awl. Furthermore, U.S. Pat Nos. 5,120,318 to Nallapareddy; 5,290,276 to Sewell, Jr.; and 3,727,602 to Hyden et al. all relate to penetrating or surgical instruments.

In this respect, the fish penetrating tool according to the present invention substantially departs from the conventional concepts and designs of the prior art, and in doing so provides an apparatus primarily developed for the purpose of killing fish.

Therefore, it can be appreciated that there exists a continuing need for new and improved fish penetrating tool which can be used for killing fish. In this regard, the present invention substantially fulfills this need.

SUMMARY OF THE INVENTION

In view of the foregoing disadvantages inherent in the known types of penetrating instruments now present in the prior art, the present invention provides an improved fish penetrating tool. As such, the general purpose of the present invention, which will be described subsequently in greater detail, is to provide a new and improved fish penetrating tool and method which has all the advantages of the prior art and none of the disadvantages.

To attain this, the present invention essentially comprises a fish penetrating tool having both an opened orientation and a closed orientation. The tool includes a handle portion having a rearward end, a forward end, an exterior surface, and an interior region. The interior region has a major hollow cylindrical portion and a minor hollow rectangular portion with a first and a second side. The minor hollow rectangular portion includes a first hollow locking channel formed along a first side and a second hollow locking channel formed along a second side. The exterior surface of the handle portion adjacent the forward end is threaded. Additionally, an aperture is formed through the handle portion adjacent the forward end. A band of reflective material is positioned upon the exterior surface and encircles the handle adjacent the rearward end. The tool also includes a penetrating needle having a first end, a second end, and an intermediate extent therebetween. The first end of the needle is pointed. A plurality of outwardly extending barbs are position upon the penetrating needle adjacent the first end. Additionally, a locking block is secured to the second end of the penetrating needle. This locking block has a forward end, a rearward end, first and second side edges, an upper surface and a lower surface. A first locking protrusion extends from the first side of the locking block while a second locking protrusion extends from the second side of the locking block. This locking block is dimensoned to be received within the minor hollow rectangular portion of the handle such that the first locking protrusion is inserted within the first locking channel and the second locking protrusion is inserted within the second locking channel. A forward aperture is formed within the upper surface of the locking block, and a rearward aperture is formed within the upper surface of the locking block. The tool also includes a locking lever having a cam end and an opposite end. A spring biased peg is employed which includes an upper end and a lower end and an intermediate extent therebetween. The lower end of this peg is dimensioned to be received within either the forward or rearward aperture of the locking block. Furthermore, the peg is positioned within the aperture formed within the handle portion. The cam end of the locking lever is pivotally interconnected to the peg, and has a first orientation wherein the peg is disengaged from apertures of the locking block and a second orientation wherein the cam brings the peg into engagement with one of the apertures of the locking block. A spring is positioned about the intermediate extent of the peg and functions to urge the peg out of engagement with the aperture of the locking block. The tool further includes a cap which has an exterior surface and a threaded interior. A band of reflective material is positioned upon the exterior surface of this cap and encircles the cap. The cap is adapted to be threadably secured over the forward end of the handle. Thus, the fish penetrating tool has a first orientation wherein the rearward end of the locking block is secured within the handle portion and secured by way of the locking lever, and a second orientation wherein the forward end of the locking block is secured within the handle portion with the fish penetrating needle positioned within the major hollow cylindrical portion and the cap is threadably secured over the forward end of the handle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved fish penetrating tool which have all the advantages of the prior art penetrating instruments and none of the disadvantages.

It is another object of the present invention to provide new and improved fish penetrating tool which may be easily and efficiently manufactured and marketed.

It is further object of the present invention to provide new and improved fish penetrating tool which are of durable and reliable constructions.

An even further object of the present invention is to provide new and improved fish penetrating tool which are susceptible of a low cost of manufacture with regard to both materials and labor, and which accordingly are then susceptible of low prices of sale to the consuming public, thereby making such fish penetrating tool economically available to the buying public.

Still yet another object of the present invention is to provide new and improved fish penetrating tool which provide in the apparatuses and methods of the prior art some of the advantages thereof, while simultaneously overcoming some of the disadvantages normally associated therewith.

Even still another object of the present invention is to provide a self contained tool to kill fish.

Lastly, it is an object of the present invention to provide new and improved fish penetrating tool. The tool finds application in killing fish which have been previously caught by the user. The tool has both an opened and a closed orientation. In its broadest context, the tool includes a handle with a hollow interior and a fish penetrating needle. The needle can be secured to the handle in a first sense with the needle extending outwardly from the handle and a second sense with the needle secured within the hollow interior of the handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a view taken along line 4—4 of FIG. 2.

FIG. 4 is a view taken along line 3—3 of FIG. 2.

The same reference numerals refer to the same parts through the various Figures.

DESCRIPTION OF THE PREFERRED EMBODIMENT

Figure 1:
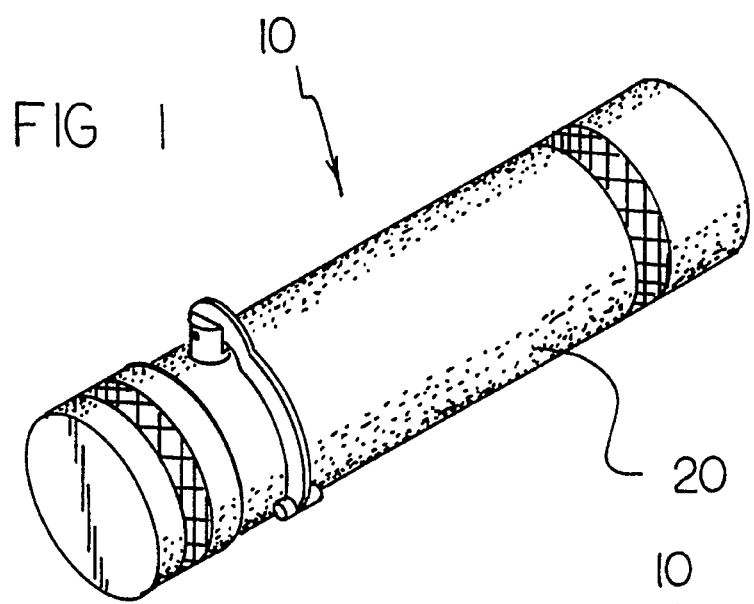
FIG. 1 is a perspective view of the preferred embodiment of the fish penetrating tool constructed in accordance with the principles of the present invention.
Figure 2:
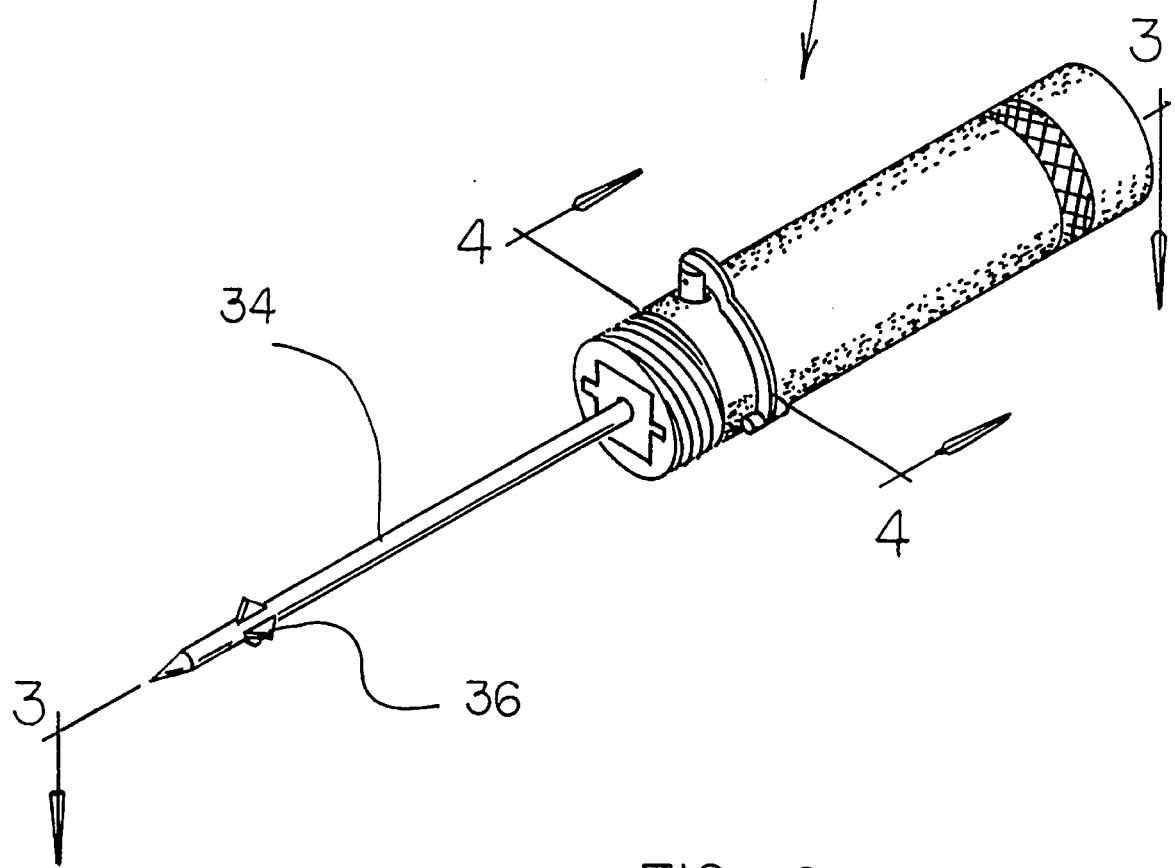
FIG. 2 is a view of the tool in its opened orientation.

With reference now to the drawings, and in particular to FIG. 1 thereof, the preferred embodiment of the new and improved fish penetrating tool embodying the principles and concepts of the present invention and generally designated by the reference numeral 10 will be described.

The present invention relates to a fish penetrating tool. The tool finds application in killing fish which have been previously caught by the user. The tool has both an opened and a closed orientation. In its broadest context, the tool includes a handle with a hollow interior and a fish penetrating needle. The needle can be secured to the handle in a first sense with the needle extending outwardly from the handle and a second sense with the needle secured within the hollow interior of the handle. The various components of the present invention, and the manner in which they interrelate, will be described in greater detail hereinafter.

The handle portion 20 is defined by a rearward end, a forward end, an exterior surface, and an interior region. The exterior surface of the handle portion can include ridges to provide a sure grip surface. This interior region includes a major hollow cylindrical portion 22 and a minor hollow rectangular portion 24. This minor rectangular portion 24 includes both a first and a second side. Additionally, the minor hollow rectangular portion 24 includes a first hollow locking channel 26 formed along a first side and a second hollow locking channel 28 formed along a second side. The exterior surface of the handle portion 20 adjacent the forward end is threaded. The function of these threads will be described in greater detail hereinafter. An aperture 32 is formed through the handle portion 20 adjacent the forward end. The function of this aperture will be described in greater detail hereinafter. In order to facilitate a user in finding the tool, a band of reflective material is positioned upon its exterior surface and encircles the handle adjacent the rearward end.

The other component of the tool of the present invention is the penetrating needle 34. The penetrating needle 34 is defined by a first end, a second end, and an intermediate extent therebetween. The first end of the needle is pointed to enable its insertion into a fish. Additionally, a plurality of outwardly extending barbs 36 are position upon the penetrating needle 34 adjacent the first end. These barbs 34 facilitate the killing of the fish when the needle is inserted. A locking block 38 is employed is securing the needle 34 to the handle 20. This locking block 38 is secured to the second end of the penetrating needle 34. The locking block 38 is defined by a forward end, a rearward end, first and second side edges, an upper surface and a lower surface. Additionally, a first locking protrusion 46 extends from the first side of the locking block 38 and a second locking protrusion 48 extends from the second side of the locking block 38. The locking block 38 is dimensioned to be received within the minor hollow rectangular portion 24 of the handle 20 such that the first locking protrusion 46 is inserted within the first locking channel 26 and the second locking protrusion 48 is inserted within the second locking channel 28. Thus, the locking block 38 serves to interconnect the needle 34 and handle portions of the tool 10. The locking protrusions ensure that there is no relative rotation or movement between the needle and handle. Additionally, a forward aperture 52 formed within the upper surface of the locking block 38, and a rearward aperture 54 is formed within the upper surface of the locking block 38. The function of these apertures will be described in greater detail hereinafter.

Figure 5:
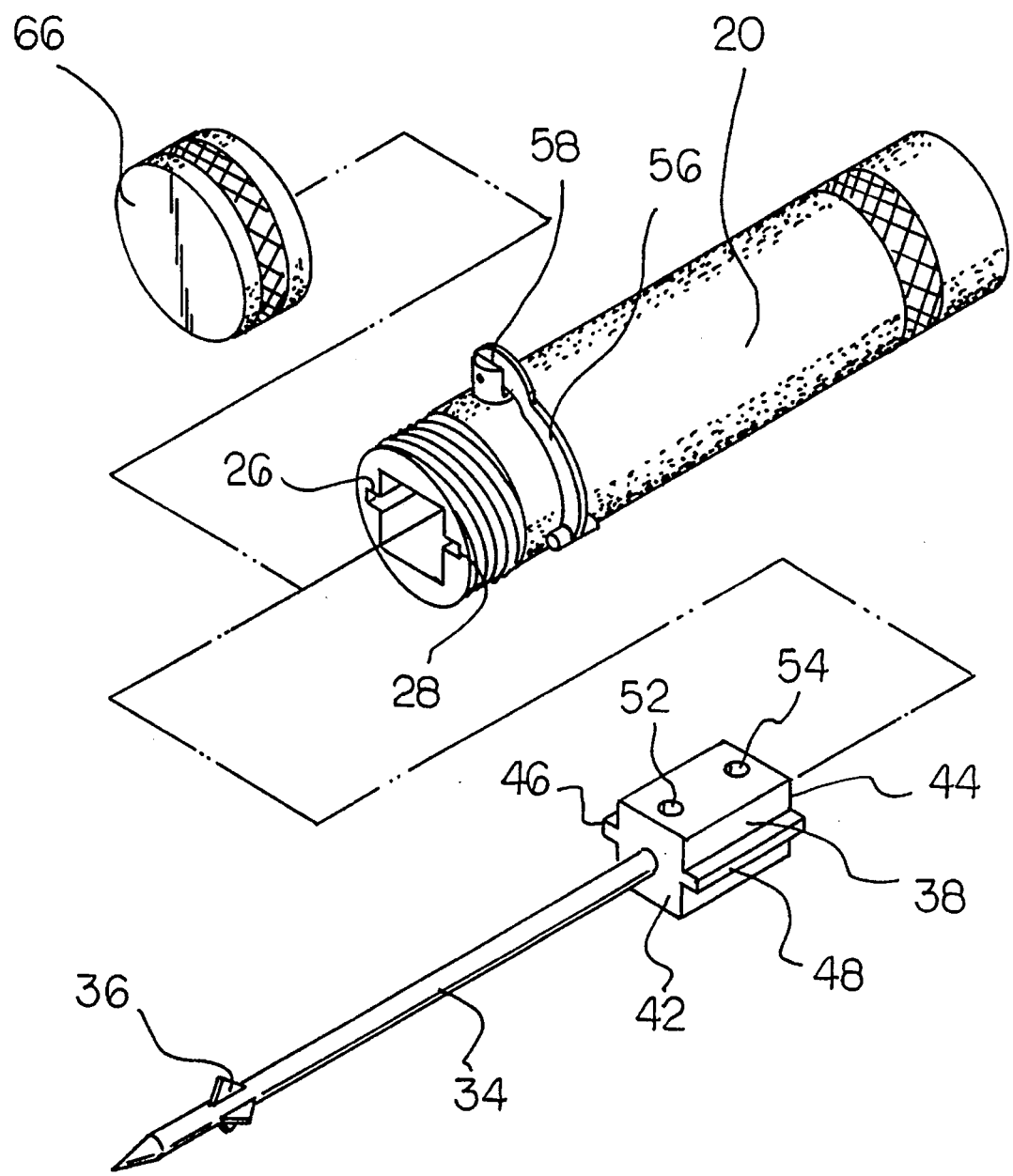
FIG. 5 is an exploded view of the tool in accordance with the present invention.

The tool 10 further includes a locking mechanism which is employed in ensuring a positive lock between the handle and the needle. One component of the locking mechanism is the locking lever 56. The locking lever 56 includes a cam end 58 and an opposite end. Another component of the locking mechanism is a spring biased peg 62 which is defined by an upper end and a lower end and an intermediate extent therebetween. The lower end of the peg 62 is dimensioned to be received within either the forward 52 or rearward 54 aperture of the locking block 38. Furthermore, the intermediate extent of the peg 62 is positioned within the aperture 32 formed within the handle portion 20 of the tool 10. Movement of this peg 62 is effected by the cam portion 58 of the locking lever 56. More specifically, the cam end 58 of the locking lever 56 is pivotally interconnected to the peg by way of two standards which are positioned on either side of the aperture 32. Thus, the lever 56 has a first orientation wherein the peg 62 is disengaged from apertures of the locking block 38 and a second orientation wherein the cam 58 brings the peg 62 into engagement with one of the apertures 52 and 54 of the locking block 38. A spring 64 is positioned about the intermediate extent of the peg 62 and functions to urge the peg 62 out of engagement with the aperture of the locking block 38. Thus, in use an operator can bring the lever into its first orientation which allows the spring to retract the peg. In this orientation the needle portion, and associated locking block, can be inserted into or withdrawn from the handle portion of the tool. When the operator wishes to lock the needle relative to the tool, the lever is brought to its second orientation. In this orientation, the cam urges the peg downward against the action of the spring. The peg can be brought into engagement with either the forward aperture of the locking block or the rearward aperture of the locking block. As can be appreciated from FIG. 5, engagement of the peg with the forward aperture extends the needle further outward relative to the handle.

The tool also includes a cap portion 66. This cap 66 includes an exterior surface and a threaded interior. As with the handle portion, a band of reflective material can be affixed upon the exterior surface of the cap 66 to encircling the cap. Again, this reflective material enables a user to better find the tool in dimly light conditions. Furthermore, as is apparent from FIG. 5, the cap 66 is adapted to be threadably secured over the forward end of the handle 20. Thus, the fish penetrating tool 10 has a first orientation wherein the rearward end of the locking block 38 is secured within the handle portion 20 and secured by way of the locking lever 56. Additionally, the tool 10 has a second orientation wherein the forward end 42 of the locking block is secured within the handle portion 20 with the fish penetrating needle 34 positioned within the major hollow cylindrical portion 22. The locking mechanism can also be employed with the device in this second orientation. Additionally, with the tool 10 in its second orientation the cap 66 can be threadably secured over the forward end of the handle 20 to create a self contained unit.

Thus, the fish killing tool of the present invention includes a sure grip handle and a chisel end spike. The handle and spike in the preferred embodiment are 6 inches long. Furthermore, in the preferred embodiment there are four barbs which protrude from the end of the needle approximately 1/16 of an inch. To kill a fish the needle is firmly pushed into the skull of the fish above and between the eyes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fish penetrating tool having both an opened orientation and a closed orientation, the tool comprising in combination:

a handle portion having a rearward end, a forward end, an exterior surface, and an interior region, the interior region having a major hollow cylindrical portion and a minor hollow rectangular portion with a first and a second side, the minor hollow rectangular portion including a first hollow locking channel formed along a first side and a second hollow locking channel formed along a second side, the exterior surface of the handle portion adjacent the forward end being threaded, an aperture formed through the handle portion adjacent the forward end, a band of reflective material positioned upon the exterior surface and encircling the handle adjacent the rearward end;

a penetrating needle having a first end, a second end, and an intermediate extent therebetween, the first end being pointed, a plurality of outwardly extending barbs position upon the penetrating needle adjacent the first end, a locking block secured to the second end of the penetrating needle, the locking block having a forward end, a rearward end, first and second side edges, an upper surface and a lower surface, a first locking protrusion extending from the first side of the locking block and a second locking protrusion extending from the second side of the locking block, the locking block dimensoned to be received within the minor hollow rectangular portion of the handle such that the first locking protrusion is inserted within the first locking channel and the second locking protrusion is inserted within the second locking channel, a forward aperture formed within the upper surface of the locking block, a rearward aperture formed within the upper surface of the locking block;

a locking lever having a cam end and an opposite end, a spring biased peg having an upper end and a lower end and an intermediate extent therebetween, the lower end of the peg dimensioned to be received within either the forward or rearward aperture of the locking block, the peg positioned within the aperture formed within the handle portion, the cam end of the locking lever is pivotally interconnected to the peg, the lever having a first orientation wherein the peg is disengaged from apertures of the locking block and a second orientation wherein the cam brings the peg into engagement with one of the apertures of the locking block, a spring positioned about the intermediate extent of the peg and functioning to urge the peg out of engagement with one of the apertures of the locking block;

a cap having an exterior surface and a threaded interior, a band of reflective material upon the exterior surface of the cap and encircling the cap, the cap adapted to be threadably secured over the forward end of the handle, the fish penetrating tool having a first orientation wherein the rearward end of the locking block is secured within the handle portion and secured by way of the locking lever, and a second orientation wherein the forward end of the locking block is secured within the handle portion with the fish penetrating needle positioned within the major hollow cylindrical portion and the cap is threadably secured over the forward end of the handle.

2. A fish penetrating tool having both an opened orientation and a closed orientation, the tool comprising in combination:

a handle portion having a rearward end, a forward end, an exterior surface, and an interior region, the interior region having a major hollow cylindrical portion and a minor hollow rectangular portion with a first and a second side, the minor hollow rectangular portion including a first hollow locking channel formed along a first side and a second hollow locking channel formed along a second side, the exterior surface of the handle portion adjacent the forward end being threaded, an aperture formed through the handle portion adjacent the forward end;

a penetrating needle having a first end, a second end, and an intermediate extent therebetween, the first end being pointed, a locking block secured to the second end of the penetrating needle, the locking block having a forward end, a rearward end, first and second side edges, an upper surface and a lower surface, a first locking protrusion extending from the first side of the locking block and a second locking protrusion extending from the second side of the locking block, the locking block dimensoned to be received within the minor hollow rectangular portion of the handle such that the first locking protrusion is inserted within the first locking channel and the second locking protrusion is inserted within the second locking channel, a forward aperture formed within the upper surface of the locking block, a rearward aperture formed within the upper surface of the locking block;

a locking lever having a cam end and an opposite end, a spring biased peg having an upper end and a lower end and an intermediate extent therebetween, the lower end of the peg dimensioned to be received within either the forward or rearward aperture of the locking block, the peg positioned within the aperture formed within the handle portion, the cam end of the locking lever is pivotally interconnected to the peg, the lever having a first orientation wherein the peg is disengaged from apertures of the locking block and a second orientation wherein the cam brings the peg into engagement with one of the apertures of the locking block;

a cap having an exterior surface and a threaded interior, the cap adapted to be threadably secured over the forward end of the handle, the fish penetrating tool having a first orientation wherein the rearward end of the locking block is secured within the handle portion and secured by way of the locking lever, and a second orientation wherein the forward end of the locking block is secured within the handle portion with the fish penetrating needle positioned within the major hollow cylindrical portion and the cap is threadably secured over the forward end of the handle.

3. The fish penetrating tool as described in claim 2 further wherein:

a plurality of outwardly extending barbs are positioned upon the penetrating needle adjacent the first end.

4. The fish penetrating tool as described in claim 2 including;

a spring positioned about the intermediate extent of the peg and functioning to urge the peg out of engagement with one of the apertures of the locking block.

5. The fish penetrating tool as described in claim 2 further comprising:

a band of reflective material upon the exterior surface of the cap and encircling the cap; and, a band of reflective material positioned upon the exterior surface and encircling the handle adjacent the rearward end.

* * * * *